United States Patent [19]
Kawasaki et al.

[11] Patent Number: 4,911,945
[45] Date of Patent: Mar. 27, 1990

[54] PROCESS FOR PREPARING FOOD PRODUCT IN THE FORM OF BUNDLE OF MEMBRANES

[75] Inventors: Yoichi Kawasaki; Tatsuo Ueda; Nobuhiro Ohtsubo, all of Sennan, Japan

[73] Assignee: Fuji Oil Company, Ltd., Osaka, Japan

[21] Appl. No.: 253,217

[22] Filed: Oct. 3, 1988

Related U.S. Application Data

[63] Continuation-in-part of Ser. No. 122,950, Nov. 19, 1987, abandoned.

[30] Foreign Application Priority Data

Nov. 22, 1986 [JP] Japan ................................. 61-279107

[51] Int. Cl.$^4$ ............................................... A23J 1/14
[52] U.S. Cl. .................................... 426/656; 426/516; 426/634

[58] Field of Search ............... 426/656, 658, 516, 634, 426/629

[56] References Cited

U.S. PATENT DOCUMENTS 4,642,241 1/1987 Noguchi ............................. 426/634
4,777,059 10/1988 Tanaka et al. ....................... 426/656

Primary Examiner—Donald E. Czaja
Assistant Examiner—Celine T. Callahan
Attorney, Agent, or Firm—Wenderoth, Lind & Ponack

[57] ABSTRACT

A process for preparing a food product in the form of a bundle of membranes which comprises subjecting a mixture of oil seed protein, 0.17 to 0.76 part by weight of starch per one part by weight of oil seed protein and water to a heat treatment using a twin-screw extruder under pressure, and extruding the resultant through a die, the content of said oil seed protein in said mixture being 50 to 70% by weight based on the total weight of starting materials other than water.

7 Claims, 2 Drawing Sheets

PROCESS FOR PREPARING FOOD PRODUCT IN THE FORM OF BUNDLE OF MEMBRANES

This application is a continuation-in-part application of application Ser. No. 122,950 filed Nov. 19, 1987, abandoned.

FIELD OF THE INVENTION

The present invention relates to a process for preparing a food product in the form of a bundle of membranes. More particularly, the food product of the present invention is prepared by extrusion from a twin-screw extruder. The product can be readily reconstituted with hot water to produce light and flexible tissue and mouthfeel. Further, the product has a thin membrane structure which split into thin membranes along an extrusion direction (almost coaxially), while its longitudinal and cross sections to the extrusion direction have porous structures, and further the thin membranes have microfibrous structures which can be split into microfibers along the extrusion direction.

BACKGROUND OF THE INVENTION

Membrane-like food products have heretofore been known. For example, traditionally "yuba (dried bean curds)", and, recently, edible soybean protein films and the like have been known.

"Yuba" has flexible mouthfeel. However, it has heavy mouthfeel and lacks lightness. Further, its stability during storage is not so good. This is partly resulted from its dense structure containing oil.

Further, there have been known food products having membrane-like structures prepared by extrusion. Among products prepared by using a twin-screw extruder, there are laminated products having good feeling of mastication. However, they lack flexibility and lightness. For example, Japanese Patent Application No. 60-202679 discloses a membrane-like food product prepared by using a twin-screw extruder. The product, however, has less flexible mouthfeel than "yuba", and lacks lightness.

On the other hand, although puffed food products containing starch as their main components have porous structure sections, they do not have bundle of membrane structures which can be peeled off along an extrusion direction almost into coaxial tubes after reconstitution with hot water. In addition, they have such a defect that they may be dissolved upon reconstitution with hot water, while they have light mouthfeel like snack confections when eaten at they are without reconstitution.

OBJECT OF THE INVENTION

The present inventors have attempted to obtain a food product in the form of a bundle of membranes having novel mouthfeel (i.e. light and flexible) to match with the lightness demanded in the market.

That is, during the course of the study on a twin-screw extruder for producing a tissue soybean protein, the present inventors have found that a desired food product in the form of a bundle of membranes, which produces light and flexible mouthfeel upon simple reconstitution with hot water without necessity of any other particular step such as boiling, can be readily obtained by subjecting a starting material containing oil seed protein and a certain amount of starch as main components and water to a heat-treatment with using a twin-screw extruder under pressure, and extruding the resultant through a die.

SUMMARY OR THE INVENTION

Figure 1:
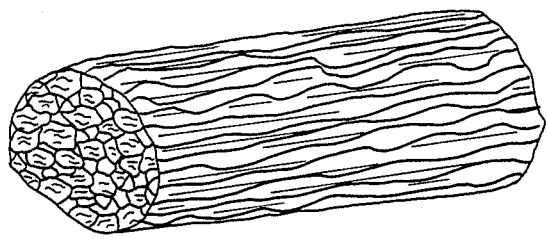
FIG. 1 is a schematic perspective view of the food product in the form of a bundle of membranes obtained in Example 1 hereinafter.
Figure 2:
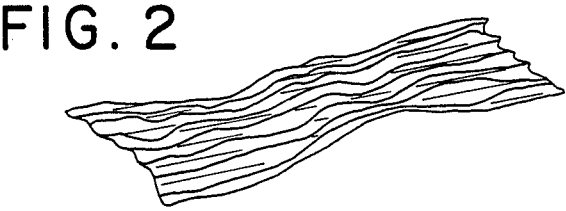
FIG. 2 is a schematic perspective view of the membrane of the food product in the form of a bundle of membranes of FIG. 1.
Figure 3:
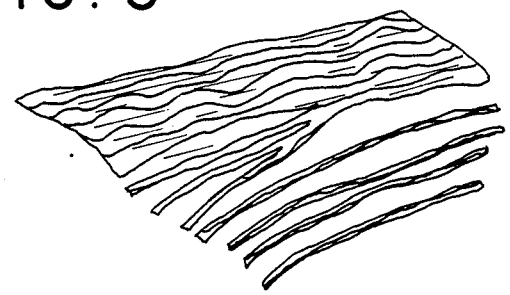
FIG. 3 is a schematic perspective view of the membranes of FIG. 2 partly splitting into fibers.
Figure 4:
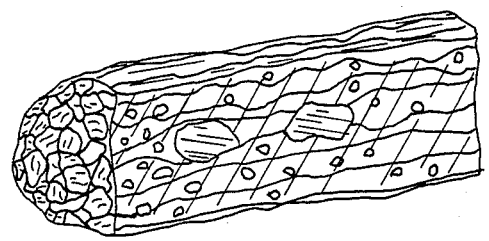
FIG. 4 is a schematic perspective view of the longitudinal section of the food product in the form of a bundle of membranes obtained in Example 1 hereinafter.
Figure 5:
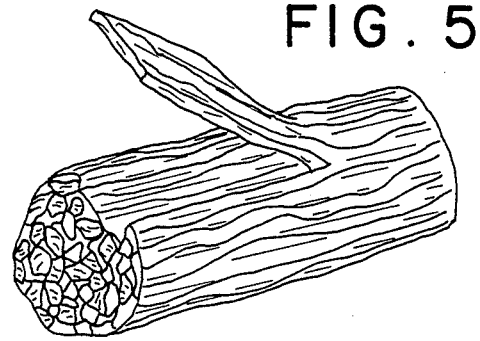
FIG. 5 illustrate the food product in the form of a bundle of membranes of FIG. 1 in which the food is partly torn into membranes.

According to the present invention, there is provided a process for preparing a food product in the form of a bundle of membranes which comprises subjecting a mixture of oil seed protein, 0.17 to 0.76 part by weight of starch per one part by weight of oil seed protein and water to a heat treatment using a twin-screw extruder under pressure, and extruding the resultant through a die, the content of said oil seed protein in said mixture being 50 to 70% by weight based on the total weight of starting materials other than water.

By using the above amount of starch, the food product in the form of a bundle of membranes of the present invention can be more readily reconstituted with hot water to produce lighter and more flexible mouthfeel in comparison with the above laminate food products. Further, the product of the present invention has a structure of a bundle of membranes which can be split into thin, coaxial tubular membranes along the extrusion direction after reconstitution with hot water, while its longitudinal and cross sections have porous structures. The thin membranes have microfibrous structure which can be split into microfibers along the extrusion direction, while exhibiting a winkled appearance like a split-fiber used for packing. Thus, the process of the present invention is different from the above known process in that the former produces a novel raw material for food.

DETAILED DESCRIPTION OF THE INVENTION

The suitable oil seed protein used in the present invention is a heat coagulable protein such as those of soybean, rapeseed, peanut and the like or materials containing these protein. Especially, soybean protein is preferred because of its availability and economical advantages. For example, as soybean protein, there can be used defatted soybean meal (or flake), soybean protein concentrate, and soybean protein isolate alone, or in combination with fibrous components such as "okara" (soybean curd residue). In the case of using fibrous components such as "okara", the amount thereof is preferably not more than 25% by weight, more preferably not more than 21% by weight based on the total weight of the starting materials other than water. When the amount of the components is too much, it is difficult to obtain a structure of a bundle of membranes.

When using heat coagulable protein in combination with non-heat coagulable protein (e.g. casein) and/or protein having low heat coagulability (e.g. hydrolyzed protein), more soft and flexible mouthfeel and improved feeling of swallowing can be provided.

The content of oil seed protein in the mixture of the starting material is 50 to 70% by weight, preferably, 54 to 66% by weight based on the total weight of starting materials other than water.

When the content of oil seed protein in the mixture is less than 50% by weight, an extruded product hardly forms a tissue and it is difficult to obtain a membrane-like structure. On the other hand, when the content is higher than 70% by weight, an extruded product becomes too dense and it is also difficult to obtain a membrane-like structure.

Examples of starch used in the present invention include powder of cereals such as rice, wheat or corn meal, or starch obtained from them; potatoes such as potato, sweet potato, cassava or starch obtained from them; other various starch products and the like. Starch contributes to provide expansion properties (sectional porosity) and membrane-like tissue (thin membrane release properties along the extrusion direction) as well as to give lighter and more flexible mouthfeel based on synergistic effect with protein.

The suitable ratio of oil seed protein and starch is 0.17 to 0.76 part by weight, preferably, 0.25 to 0.61 part by weight of starch per one part by weight of oil seed protein.

When starch is less than 0.17 part by weight, the product lacks a membrane structure which can be split into membranes after reconstitution with hot water, although it has a fibrous structure along the extrusion direction like a conventional fibrous protein obtained by using a twin-screw extruder. Further, in general, it has a dense tissue and lacks porosity and, after reconstitution with hot water, it is hard to masticate. Accordingly, light and flexible mouthfeel can not be expected. On the other hand, when the amount of starch exceeds 0.76 part by weight, the product may sufficiently swell and produces porous sections. It has light mouthfeel, when eating it as it is. However, after reconstitution with hot water, the product may become sticky like a paste, resulting in poor mouthfeel, and undesirably losing its flexibility.

In general, water content in the mixture of the starting materials is preferably 20 to 30% by weight. With less water content, the product can readily swell but tend to be readily burnt. On the other hand, with much water content, swelling may be inhibited and its light mouthfeel may be undesirably spoiled.

In the present invention, the mixture of the starting materials are subjected to a heat treatment under pressure using a twin-screw extruder and extruded through a die to obtain the desired food product in the form of a bundle of membranes.

In the present invention, the twin-screw extruder to be used is not limited to a specific one and any known twin-screw extruder can be used.

When using a single-screw extruder, it is difficult to produce a food product having a membrane structure along the extrusion direction, and to continuously obtain a food product in the form of a bundle of membranes having constant quality and shape due to unsteady extrusion. In contrast to this, when using a twin-screw extruder, a product can be continuously and quite easily produced with constant quality and shape. It is considered that this would be resulted from the difference between properties of a single-screw extruder and those of a twin-screw extruder.

Figure 6:
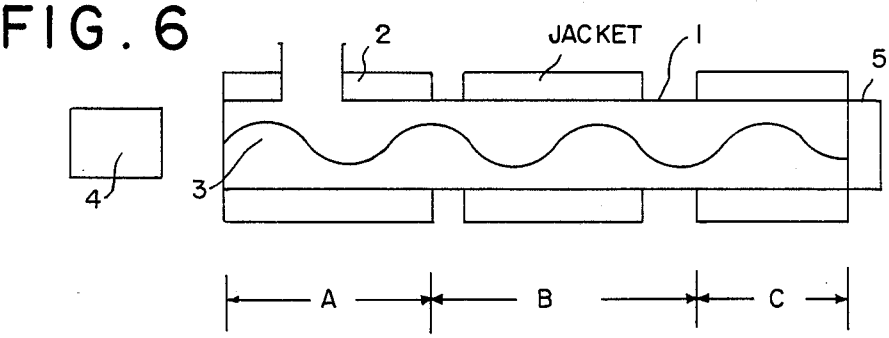
FIG. 6 is a schematic side view of a twin extruder used in the present invention.

In FIG. 6, a schematic side view of a twin-screw extruder used in the present invention is shown. In general, a twin-screw extruder is composed of a jacketed barrel 1 having a feed hopper 2 and containing a twin-screw 3 which is driven by a motor 4 provided at, for example, one end of the barrel 1 and a die 5 provided at the other end of the barrel 1. For convenience, the barrel 1 is divided into three parts from the feeder side toward the die side along the extruded direction, i.e., fore part A (usually, about ⅓ to 2/5 of the entire length of the barrel), heating part B and melting tip part C (usually, about 1/5 to ⅓ of the entire length of the barrel).

The mixture of the starting materials is fed through the feed hopper to the fore part wherein the mixture is mixed and kneaded during transportation toward the heating part due to rotation of the twin-screw. In this part, the mixture is pre-heated with a heating medium such as steam passing through the jacket. Then, in the heating part, the mixture is compressed and heated under pressure during further transportation toward the melting tip part due to rotation of the twin-screw. In this part, heating is mainly effected by heat of compression and, therefore, the temperature of the mixture is controlled by passing a cooling medium such as water or a heating medium such as steam through the jacket. In the melting tip part, the mixture is molten and extruded through the die. The extruded mixture is expanded to obtain the desired food product in the form of a bundle of membranes.

In a twin-screw extruder, from the viewpoint of transporting, mixing and pre-heating the starting materials, the fore part for the starting materials of the extruder is of importance and it is desired to appropriately combine one or more ball threads, kneading disks, inverse helical ball threads and the like as the screws. From the viewpoint of melting and shearing of the starting materials, the melting tip part is of importance and it is desired to appropriately combine one or more pineapple threads, inverse helical pineapple threads, kneading disks, inverse helical ball threads and the like as the screws.

In general, the applied pressure is preferably about 10 to 50 kg/cm$^2$ at the die face.

Preferably, in a twin-screw extruder, the fore part of the barrel is heated to about 70° to 110° C., the heating part is heated to about 100° to 170° C. and the melting tip part is heated to about 140° to 180° C. When a temperature is too high, the product is liable to be readily burnt, which is not desirable.

As the die, not only a slit die or a round die but also any form of a die can be used. The size of a die is not specifically limited. Cooling of the die is not required in the present invention. If a temperature of the die is lower than 100° C., an extruded mixture can not be expanded and the desired food product in the form of a bundle of membranes and having porous puffed structure can not be obtained. Therefore, a temperature of the die should be higher than 100° C., preferably the same as that of the melting tip part, i.e., about 140° to 180° C.

In the present invention, it is of importance that the starting materials, which has been compounded and simultaneously heated, should be in laminar flow when it passes through the die. That is, the important thing is that the mixture of the starting materials containing oil seed protein, starch and water as main components, which has been pressurized and heated to be molten, should pass through the die in laminar flow. In laminar flow, velocities fluctuatenear the wall and the center of the die due to resistance and the like (e.g. shearing force), contributing to form a desired almost coaxially tubular membrane structure. It is assumed that, by compounding a fixed amount of a material which is soluble in hot water (e.g. starch) in the mixture of the starting materials, the hot water-soluble material contained in the membrane structure may be solubilized in water upon reconstitution with hot water, leaving a water-insoluble part which can be peeled off as thin membranes. Therefore, instead of starch used in the present invention, any material, which can be dissolved in hot water or an aqueous solvent and does not inhibit the formation of a tissue of protein, can be also used. Accordingly, it is preferred to provide a slope, for example, to make the die inlet in a funnel-like shape so that the molten starting materials can flow smoothly into the die to produce a laminar flow. Alternatively, a funnel-shaped die can be preferably used.

Further, the membrane food product of the present invention are extremely flexible after extrusion through the die in comparison with a conventional fibrous or tissue protein and the puffed porous structure is readily adhered upon pressing. Therefore, the food product in the form of a bundle of membranes having a desired shape (section) can be continuously formed by placing a guide at the die outlet. For example, the guide can have a larger diameter than that of the die outlet opening by 200 to 800% and be in the form of any desired shape (e.g. circle, oval, equilateral rectangle, rectangle, star).

When the food product in the form of a bundle of membranes of the present invention is extruded from the die or the guide, preferably, it is taken off with being slightly stretched because it is flexible. That is, it can be stretched by using means for drawing, for example, by taking up a string extruded from the die or the guide. The stretched membrane food product may be cut into appropriate size.

Although both longitudinal and cross sections of the resulting food product in the form of a bundle of membrane have porous puffed structure similar to sponge, the products have thin membrane-assembly structure which may be split into membranes along the extruding direction after reconstitution with hot water. It is considered that this would be resulted from the phenomenon that, when the laminar flow of protein and starch passes through a die under heating to form a tissue, the tissues of protein and starch are microscopically formed into layers along the direction of the laminar flow and, thereby, the starch layers would become a paste, while the protein tissue would remain after reconstitution with hot water. Thus, the protein tissue is formed almost coaxially to the flow direction and is peeled off as thin membranes. The thin membranes are wrinkled, but can be split into fibers having directional properties along the extruded direction directional like split fibers used for packing. The product can be easily reconstituted with hot water. As for mouthfeel, it is flexible like rolled or laminated "yuba", and further lighter and crisper than "yuba". Further, the product can be stored and distributed as a dried product. And, since the product can be readily reconstituted with hot water just before eating, it can be used as raw material for food for various applications.

The following Examples further illustrate the present invention in detail, but are not to be construed to limit the scope thereof.

EXAMPLE 1

By using a laboratory twin-screw extruder (L/D=15, D=46 mm), the starting materials shown in Table 1 were extruded with stretching through a molding guide (12×17 mm, thickness: 10 mm) connected to a slit die and a die having opening of 3×15 mm and thickness in the flow direction of the starting materials of 10 mm which was placed at the end point of the extruder under the conditions of feed of starting materials: 30 kg/hr; added water: 30%; barrel temperature: 150° C.; rotation of screw: 200 r.p.m.). The product was cut into about 60 mm in length. The cross section had a porous expanded structure of about 12 mm×(20 to 25) mm. The results after reconstitution with hot water are also shown in Table 1.

TABLE 1

| No. | Compounding ratio of starting materials (parts by weight) | | | | | | |
| --- | --- | --- | --- | --- | --- | --- | --- |
|  | 1 | 2 | 3 | 4 | 5 | 6 | 7 |
| Soybean isolate | 48 | 52 | 56 | 60 | 64 | 68 | 72 |
| "Okara" meal | 12 | 13 | 14 | 15 | 16 | 17 | 18 |
| α-Starch | 40 | 35 | 30 | 25 | 20 | 15 | 10 |
| Water absorption | 6.0 | 5.7 | 5.6 | 5.5 | 5.3 | 4.9 | 4.5 |
| Membrane-like tissue | X | Δ | ○ | ◎ | ○ | Δ | X |

The products were reconstituted with hot water using 20-fold amount of hot water for 30 minutes, standing to remove water, and the percentage of water absorption was determined.

The membrane tissue was evaluated according to the following criteria:
- X: The product could not be peeled off as membranes.
- Δ: Although the product could be split into short strips, it was difficult to obtain long membranes. The short strip could be split into fibers.
- ○: The product could be well peeled off as membranes. The membrane could be split into fibers.
- ◎: The product could be well peeled off as membranes, which could also be well split into fibers.

According to the above results, with much starch content, the product become a paste, or gain stickiness after reconstitution with hot water, which results in poor mouthfeel. On the other hand, with less starch content, the product are found to become hard to masticate like fibrous protein obtained by using a conventional twin-screw extruder and loses lightness and flexibility.

EXAMPLE 2

In the same manner as described in Example 1, membrane-like food products were prepared according to the composition in Table 2.

TABLE 2

| No. | Composition of the starting material (parts by weight) | |
| --- | --- | --- |
|  | 1 | 2 |
| Strong-gelation soybean protein*1 | 60 | 30 |
| Weak-gelation soybean protein*2 | — | 30 |
| "Okara" meal | 15 | 15 |

TABLE 2-continued

| | Composition of the starting material (parts by weight) | |
|---|---|---|
| No. | 1 | 2 |
| α-Starch | 25 | 25 |

*[1] Soybean isolate having gelation ability ("Fujipro-R" manufactured by FUJI OIL CO., LTD.).
*[2] Soybean isolate having weak gelation ability ("Fujipro-AL", manufactured by FUJI OIL CO., LTD.).

Although both the cross and longitudinal sections have porous net structures, the resulting products could be split into almost coaxial tubular thin membranes along the extrusion direction after reconstitution with hot water. The thin membranes were torn into thin fibers.

When the products were eaten after reconstitution with hot water to about 5.7 times in the same manner as described in Example 1, the product No. 1 had softer mouthfeel and more smoothly swallowed in comparison with the product No. 2.

Thus, it is found that mouthfeel can be changed by combination of soybean isolate having good gelation properties and that having poor gelation properties.

What is claimed is:

1. A process for preparing a food product in the form of a bundle of membranes which comprises subjecting a mixture of oil seed protein, 0.17 to 0.76 part by weight of starch per one part by weight of oil seed protein, okara and water to heat treatment using a twin-screw extruder under pressure, and extruding the resultant heat treated mixture through a die at a die temperature of higher than 100° C., the content of said oil seed protein in said mixture being 50 to 70% by weight based on the total weight of starting materials other than water and the content of said okara being at most 25% by weight based on the total weight of starting materials other than water.

2. A process according to claim 1, wherein oil seed protein is soybean protein.

3. A process according to claim 1, wherein the amount of starch is 0.25 to 0.61 part by weight per one part by weight of oil seed protein.

4. A process according to claim 1, wherein the content of the oil seed protein in the mixture is 54 to 66% by weight based on the total weight of starting materials other than water.

5. A process according to claim 1, wherein the amount of water in the mixture is 20 to 30% by weight.

6. A process according to claim 1, wherein the applied pressure is about 10 to 50 kg/cm$^2$ at a die face.

7. A process according to claim 1, wherein the fore part of the barrel of the twin screw extruder is heated to about 70° to 110° C., the heating part is heated to about 100° to 170° C. and the melting tip part is heated to about 140° to 180° C.

* * * * *